US012148978B2

(12) United States Patent
Bosshard et al.

(10) Patent No.: US 12,148,978 B2
(45) Date of Patent: Nov. 19, 2024

(54) E/H HYBRID COMBINER-DIVIDER COMPRISING AT LEAST ONE PRIMARY WAVEGUIDE APERTURE COUPLED TO TWO SECONDARY WAVEGUIDES HAVING A COMMON SIDE WALL

(71) Applicant: THALES, Courbevoie (FR)

(72) Inventors: Pierre Bosshard, Tournefeuille (FR); Fabien Nusbaum, Toulouse (FR); Nicolas Ferrando, Tournefeuille (FR)

(73) Assignee: THALES, Courbevoie (FR)

( * ) Notice: Subject to any disclaimer, the term of this patent is extended or adjusted under 35 U.S.C. 154(b) by 576 days.

(21) Appl. No.: 17/413,502

(22) PCT Filed: Dec. 3, 2019

(86) PCT No.: PCT/EP2019/083484

§ 371 (c)(1),
(2) Date: Jun. 11, 2021

(87) PCT Pub. No.: WO2020/126477

PCT Pub. Date: Jun. 25, 2020

(65) Prior Publication Data

US 2022/0069470 A1 Mar. 3, 2022

(30) Foreign Application Priority Data

Dec. 18, 2018 (FR) ...................................... 1873121

(51) Int. Cl.
*H01P 5/20* (2006.01)
*H01P 5/12* (2006.01)
(Continued)

(52) U.S. Cl.
CPC .................. *H01P 5/20* (2013.01); *H01P 5/12* (2013.01); *H01Q 5/55* (2015.01); *H01Q 21/0037* (2013.01)

(58) Field of Classification Search
CPC .......... H01P 5/20; H01P 5/12; H01Q 21/0037
(Continued)

(56) References Cited

U.S. PATENT DOCUMENTS 2,848,689 A * 8/1958 Zaleski ..................... H01P 5/12 333/252
3,375,472 A 3/1968 Walker
2016/0064796 A1* 3/2016 Merk ........................ H01P 5/02 333/27

FOREIGN PATENT DOCUMENTS

EP 3 404 766 A1 11/2018
FR 1 272 315 A 9/1961
(Continued)

*Primary Examiner* — Benny T Lee
(74) *Attorney, Agent, or Firm* — BakerHostetler

(57) ABSTRACT

A 1:4 reciprocal compact E/H hybrid combiner-divider, includes at least one primary waveguide and two secondary waveguides forming a one-piece structure configured such that the primary guide has a first end forming an input/output port and a second end defining an aperture and that each secondary guide has two ends forming two input/output ports, and a side aperture formed on one of the small side faces. The secondary guides are arranged so as to have a common side wall. They are arranged facing the primary waveguide such that the side apertures are situated facing the aperture formed by one of the ends of the primary waveguide and that the common wall is aligned with the central axis of the aperture of the primary waveguide.

8 Claims, 12 Drawing Sheets

(51) Int. Cl.
*H01Q 5/55* (2015.01)
*H01Q 21/00* (2006.01)

(58) Field of Classification Search
USPC .......................................................... 333/117
See application file for complete search history.

(56) References Cited

FOREIGN PATENT DOCUMENTS

| | | | |
|---|---|---|---|
| GB | 2 313 714 | A | 12/1997 |
| KR | 10-1514155 | B1 | 4/2015 |

* cited by examiner

E/H HYBRID COMBINER-DIVIDER COMPRISING AT LEAST ONE PRIMARY WAVEGUIDE APERTURE COUPLED TO TWO SECONDARY WAVEGUIDES HAVING A COMMON SIDE WALL

This application is a National Stage of International patent application PCT/EP2019/083484, filed on Dec. 3, 2019, which claims priority to foreign French patent application No. FR 1873121, filed of Dec. 18, 2018, the disclosures of which are incorporated by reference in their entirety.

FIELD OF THE INVENTION

The invention relates to the general field of communication satellites, and in particular to multibeam antennas fitted to these satellites.

The invention relates more specifically to antenna beamforming in the context of the use of MFB (or "Multiple Feed per Beam") antennas.

BACKGROUND

In the context of the development of current and future communication satellites, such as V-HT multibeam Ka-band satellites, the targeted geographic coverage is becoming increasingly extensive. Furthermore, since the number of users and therefore the capacity required for these satellites is constantly increasing, there is an increasingly pressing need to have antennas capable of radiating several hundred beams, typically a number of beams greater than five hundred.

There is also a need to have antennas capable of covering geographical areas with a fine resolution (small spots), that is to say, capable of forming beams with a small angular aperture.

Such coverage that is both dense and extensive is incompatible, for technical reasons, with SFB (i.e. "Single Feed per Beam") passive antenna solutions with multiple reflectors. It is however made possible by implementing single-reflector MFB (i.e. "Multiple Feed per Beam") antennas.

The applicant has developed a single-reflector MFB antenna solution, used at transmission and at reception, allowing a large number of thin beams to be produced. This solution is based on an antenna architecture consisting of sub-arrays of 4 bipolarization elements (Tx/Rx) that make it possible to generate rectangular beams using a slightly overdimensioned reflector, a reflector whose size is typically overdimensioned by 15%.

By virtue of using sub-arrays with 4 bipolarization radiating elements (Tx/Rx), preferably four horns with a circular aperture, it is possible, using an antenna with a single reflector, to generate rectangular beams (Tx/Rx) in a number sufficient to provide coverage of a given geographical area by way of a plurality of rectangular elementary spots.

Such an architecture is formed by way of an assembly of distribution modules, each comprising an RF chain (transmitter and receiver) and means for connecting the RF chain to a plurality of horns, these horns being arranged so as to be able to be combined to form a single beam.

These distribution modules form a network consisting of intertwined meshes to which the horns are connected so that their apertures are arranged in a radiating plane.

The structure and the geometry of the distribution modules are defined such that the horns connected to one and the same distribution module are arranged such that the recombination of the beams from the horns connected to one and the same module forms a single beam, associated with a spot in the covered geographical area.

The schematic illustration in FIG. 1 shows, by way of example, a partial view of a single-reflector MFB antenna architecture of the present invention intended to cover a geographical area divided into rectangular elementary spots (rectangular mesh of the covered area).

The MFB antenna under consideration here is built around a network of distribution modules 11 configured such that the horns 12 associated with one and the same distribution module are arranged at the vertices of a diamond, so as to be able to be combined to form a beam covering a given spot.

Such an antenna structure advantageously makes it possible to form highly focused antenna beams from radiating horns 12 having small-diameter apertures.

In a further aspect of the present invention, as may be seen in the basic diagram in FIG. 2, each radiating horn of the antenna thus formed is connected, at transmission and at reception, to two distribution modules corresponding to two separate beams, except for the horns covering the periphery of the geographical area, which are connected to just one module. Thus, in the illustration in FIG. 2, the reception module associated with the horn 211 is connected to the reception paths 22 and 23 corresponding to the beams n and m by the distribution modules 24 and 25.

Moreover, each distribution module is used to distribute the signal corresponding to one and the same beam over four RF chains, each chain comprising a radiating horn.

As such, in a known manner, a distribution module for coupling, at transmission, a given beam into the RF chains served by this beam consists of a power divider module formed of couplers that are arranged in two stages that are connected to one another by connection interfaces, such as waveguides for example.

In the same way, a distribution module for coupling, at reception, a given beam into the RF chains served by this beam consists of a power summer module formed of couplers that are arranged in two stages that are connected to one another by connection interfaces, such as waveguides for example.

From a structural point of view, whether it is intended for a transmission path or a reception path, a distribution module is structured in two stages, as illustrated from above by the diagram in FIG. 3.

The first coupling stage comprises a coupler 31, while the second coupling stage comprises two couplers 32 and 33.

In the case of a distribution module situated in a beam reception path, the couplers 31, 32 and 33 operate as summers.

The two couplers 32 and 33 in the second stage each sum the power, in pairs, of the signals $RX_1$, $RX_2$. $RX_3$, and $RX_4$ delivered by the reception paths of the four transmission/reception modules served by a given beam.

The coupler 31 for its part combines the summation signals delivered by the couplers 32 and 33 and delivers a sum signal RX.

In the same way, in the case of a distribution module situated in a beam transmission path, the couplers 31, 32 and 33 operate as power dividers.

The coupler 31 receives the signal to be transmitted, corresponding to the beam under consideration, and divides the signal into the signals TX1, TX2, TX3, and TX4 that are transmitted to the couplers 32 and 33, respectively.

The two couplers 32 and 33 in the second stage in turn divide the received signal into two signals. Each coupler thus delivers, to each of the transmission/reception modules to which each coupler is connected, a transmission signal TX corresponding to the signal carried by the transmission path of the beam under consideration.

Generally speaking, from an implementation point of view, the couplers 31, 32 and 33 forming a distribution module are produced in the form of cavities and connected to one another by way of waveguides 34.

Thus, as may be seen, producing a single-reflector MFB antenna such as the one in FIG. 3 described above requires, to produce all of the necessary distribution modules, using a large number of coupling devices and of connection elements between the various couplers, on the one hand, and between these couplers and the RF chain and the horns, on the other hand.

It may furthermore also be seen that installing such distribution networks results in significant intertwining of the various elements.

Therefore, if the compactness of the radiating source of a satellite antenna and the large number of horns that such a source may comprise are taken into consideration, it may prove tricky to install all of the distribution modules necessary to produce a single-reflector MFB satellite antenna.

At the present time, one solution that is used to optimize the bulk exhibited by the beam distribution system is that of producing distribution modules formed from molds in the form of half-shells that are assembled to form a set of cavities that are arranged so as to implement all of the (coupling and connection) functions performed by the module. However, due to the intertwining of the various distribution modules in such a structure, the molded elements that are produced mean that the half-shells have to adopt a tiled configuration with respect to one another, such that each distribution module thus produced is not physically independent of the neighboring modules. Such mechanical interdependence complicates the mounting or dismounting of a module, as well as the overall assembly.

Moreover, producing distribution modules in the form of molded parts forming a highly intertwined assembly makes it difficult to contemplate integrating additional functionalities, such as deviation measurement functions, which requires an appropriate combination of the received signals.

SUMMARY OF THE INVENTION

One aim of the invention is to propose a device for making it easier and more economical in terms of bulk to produce distribution modules such as those described above.

Another aim of the invention is to propose a device for implementing additional functionalities, such as the formation of deviation measurement paths.

To this end, one subject of the invention is a reciprocal compact E/H hybrid combiner-divider for coupling or splitting electromagnetic waves, comprising at least one primary waveguide and two secondary waveguides, the primary waveguide and the secondary waveguides each having a parallelepipedal structure of rectangular cross section with two ends; characterized in that the primary waveguide and the secondary waveguides form a one-piece structure in which:

- the primary waveguide has a first end configured so as to form an input/output port and a second end defining an aperture;
- the secondary waveguides having the same configuration and substantially identical dimensions, each secondary waveguide having two ends configured so as to form two input/output ports, and a side aperture formed on one of the small faces of the waveguide;
- the secondary waveguides are arranged facing one another and facing the primary waveguide so as to form, with one of their side faces, a common side wall;
- the secondary waveguides are arranged facing the primary waveguide such that the side apertures are situated facing the aperture formed by one of the ends of the primary waveguide and that the common wall is aligned with the central axis of the aperture of the primary waveguide.

According to some particular embodiments, the E/H hybrid combiner-divider comprises one or more of the following features, taken individually or in combination:

- each of the secondary waveguides comprises an internal conductive element situated in the cavity of the waveguide and in electrical contact with the wall of the guide, the internal conductive element being arranged inside the waveguide so as to optimize the matching of the impedance of the guide and the combination or the division of the waves traveling through the guide; the internal conductive element is a pin fixed in a substantially central position on the inner face of the upper wall of the guide;
- the internal conductive element is formed by a wall projecting into the guide, situated transversely in a substantially central position on the inner face of the upper wall of the guide, the height of the projection being substantially less than the height of the guide;
- the E/H hybrid combiner-divider furthermore comprises two tertiary waveguides situated transversely with respect to each of the secondary waveguides and joined thereto, each tertiary waveguide having a parallelepipedal structure of rectangular cross section with two ends, a first end configured so as to form an input-output port and a second end forming an aperture situated facing an aperture formed in the side wall of each secondary waveguide opposite the common wall, in a substantially central position, the aperture being configured so as to put each secondary waveguide in communication with a tertiary waveguide situated transversely with respect thereto, so as to achieve H-plane coupling, the combiner-divider thus having an E/H hybrid tee structure.

Another subject of the invention is a beam distribution network for a multiple feed per beam (MFB) antenna, characterized in that the network comprises a first group and a second group of hybrid combiner-dividers as defined above, each combiner-divider of the first group acting as a combiner being connected, via its secondary ports, to the reception paths of four radiating sources and to a beam reception path via its primary port; each combiner-divider of the second group acting as a combiner being connected, via its secondary ports, to the transmission paths of four radiating sources and to a beam transmission path via its primary port.

According to one particular embodiment, the beam distribution network for a multiple feed per beam (MFB) antenna comprises the following features:

- the combiner-dividers of the first group are combiner-dividers as defined above having output ports connected to a deviation measurement device.

Another subject of the invention is an (MFB) beamforming array antenna, characterized in that the antenna array comprises a plurality of radiating sources combined into groups of four radiating sources, the reception paths and the transmission paths of the radiating sources belonging to one and the same group being connected, respectively, to the secondary ports of a combiner-divider whose primary port is connected to the reception path of a beam and to the secondary ports of a combiner-divider whose primary port is connected to the transmission path of the same beam.

The present invention that is proposed advantageously largely solves the problem of intertwining of BFNs in the single-reflector solution.

The E/H hybrid component according to the invention makes it possible to combine 4 radiating elements in a small footprint limited, in the xy plane, to the access guide.

The present invention advantageously integrates, within one and the same structure, an E-plane divider for forming a sum path and two H-plane dividers for forming difference paths.

The present invention also has the property of making it possible to adapt the power sharing between the input port shared by the various paths and the output ports.

The present invention also offers the capability, within the network and for any spot, to implement a deviation measurement function (by using the sum and difference paths) in addition to the TLC (beamforming) functions by combining two magic tees, coupled to an E-plane divider, into just one and the same 1:6 (one input and six outputs) component.

BRIEF DESCRIPTION OF THE DRAWINGS

The features and advantages of the invention will be better appreciated by virtue of the following description, which description draws on the appended figures, in which.

It should be noted that, in the appended figures, the same functional or structural element preferably bears the same reference symbol.

DETAIL DESCRIPTION

Figure 4:
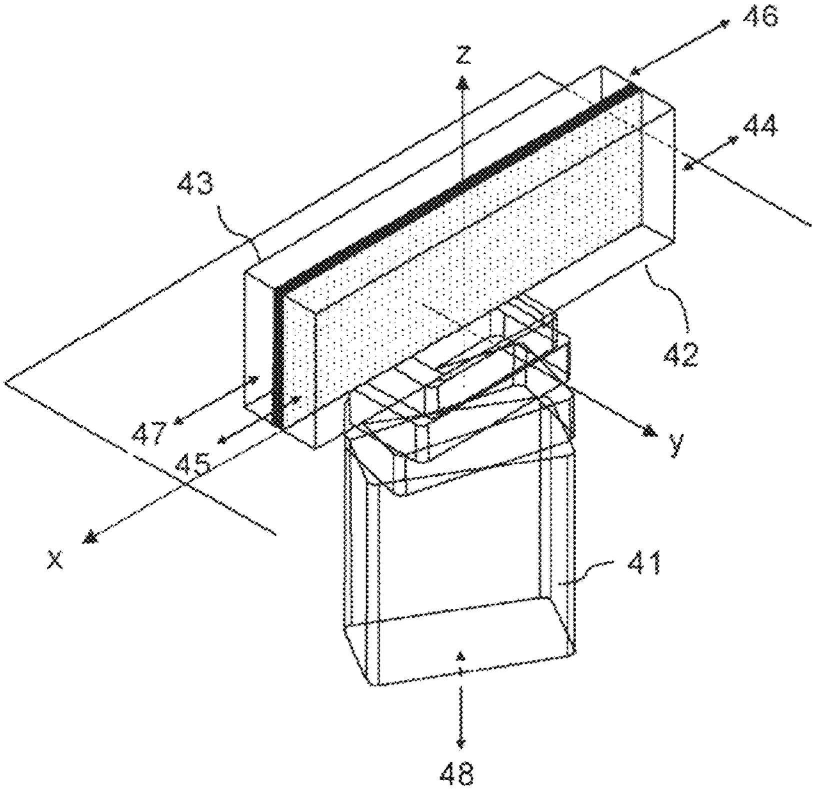
FIG. 4 shows an illustration showing an overall perspective view of the distribution module according to the invention, in a basic form.
Figure 5:
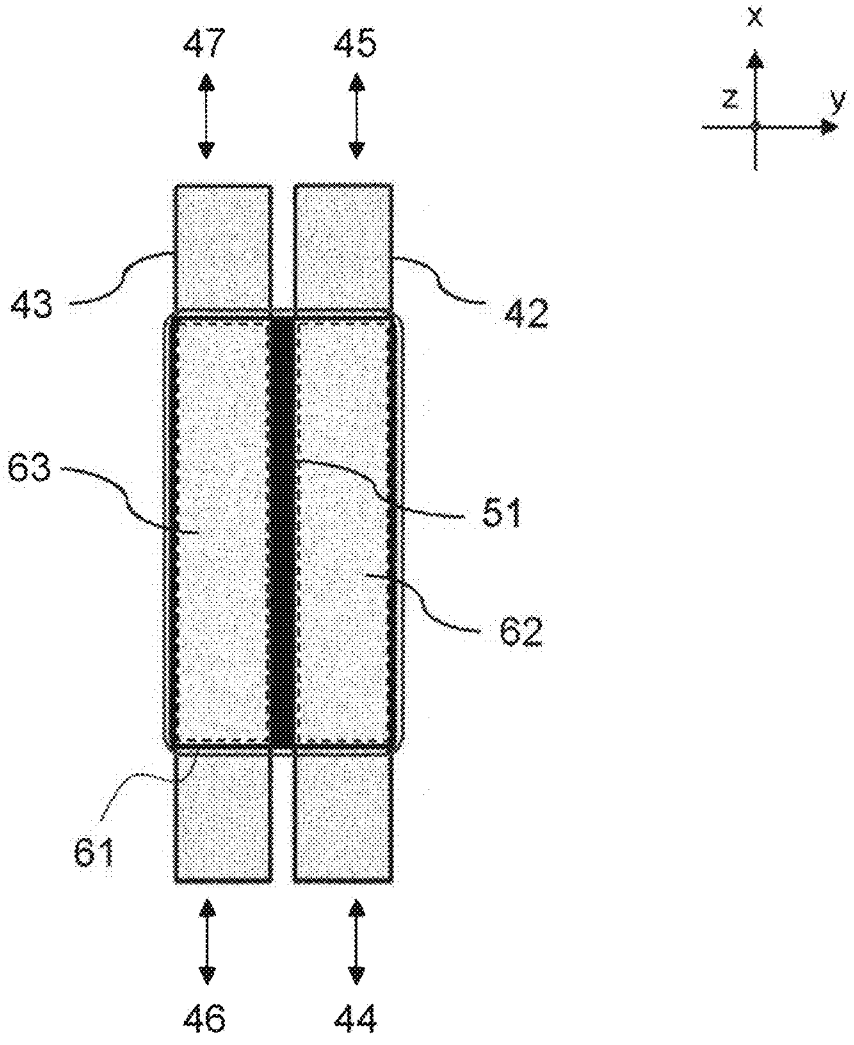
FIG. 5 shows an illustration showing a partial view from below of the distribution module according to the invention illustrated by FIG. 4, along a plane passing through the open end of the primary waveguide.
Figure 8:
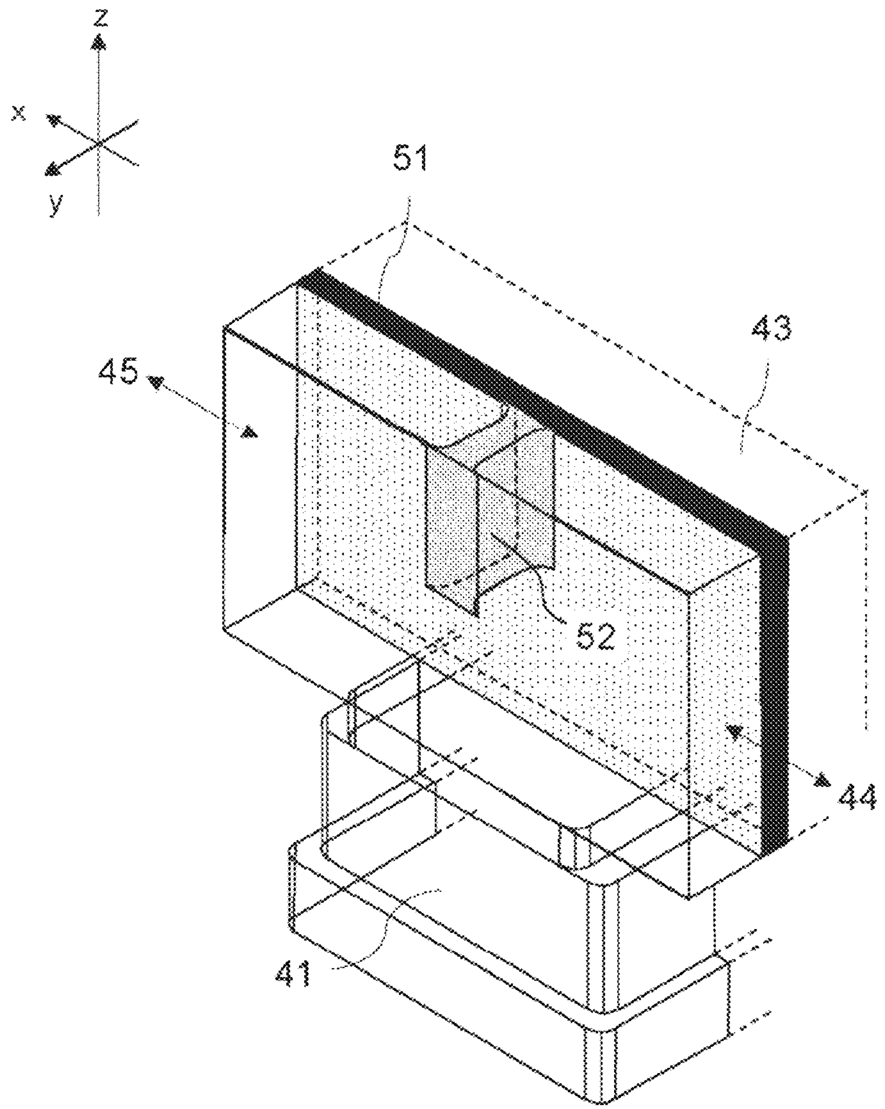
FIG. 8 shows an illustration showing a partial perspective and transparent view of the distribution module according to the invention in the embodiment of FIG. 7.
Figure 9:
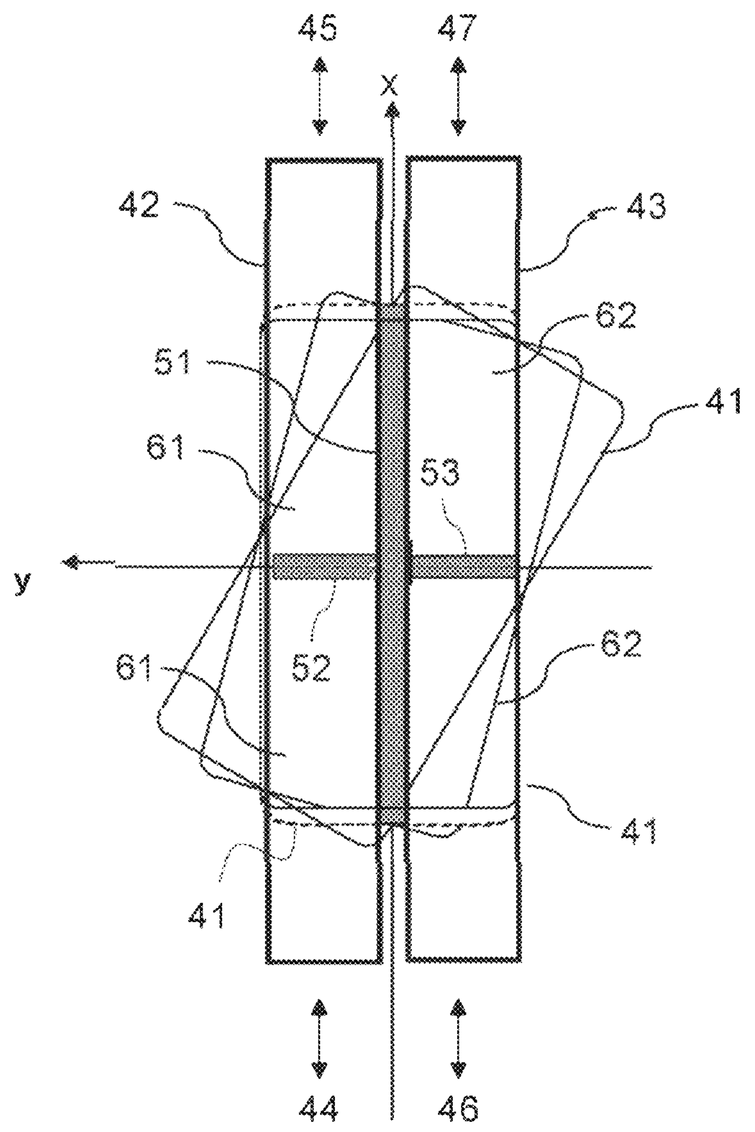
FIG. 9 shows an illustration showing a transparent view from above of the distribution module according to the invention, in the embodiment of FIG. 7.
Figure 10:
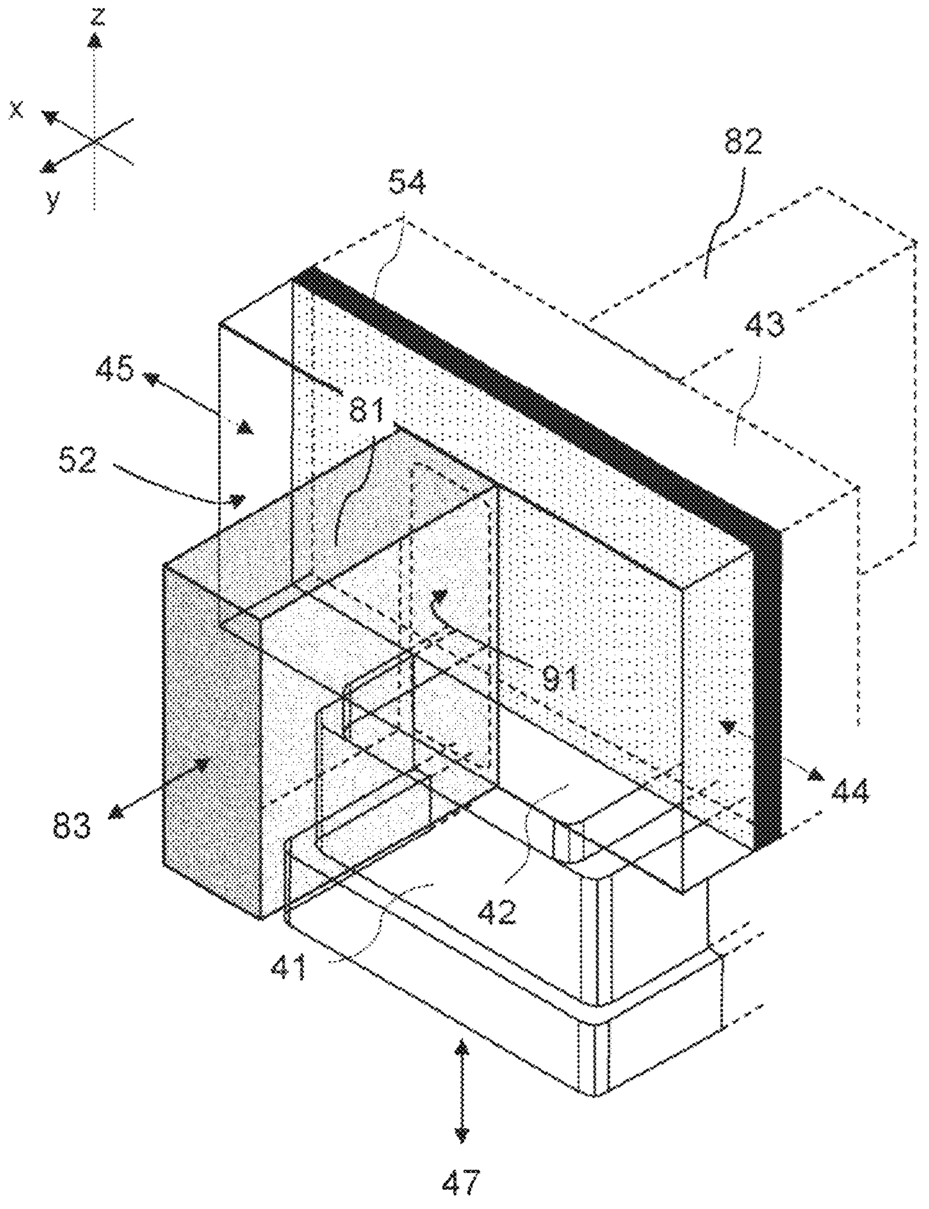
FIG. 10 shows an illustration showing a partial perspective and transparent view of the distribution module according to the invention in a third embodiment allowing the creation of deviation measurement signals.
Figure 11:
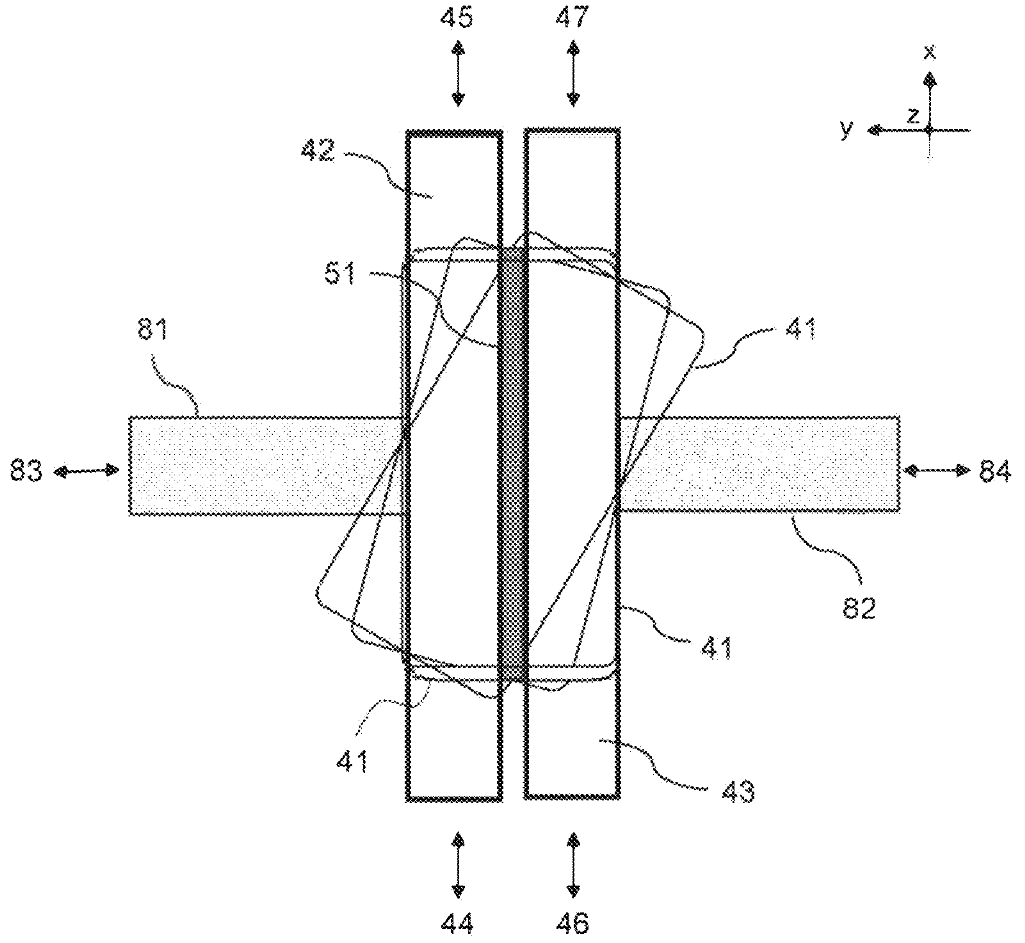
FIG. 11 shows an illustration showing a transparent view from above of the distribution module according to the invention illustrated by FIG. 10.
Figure 12:
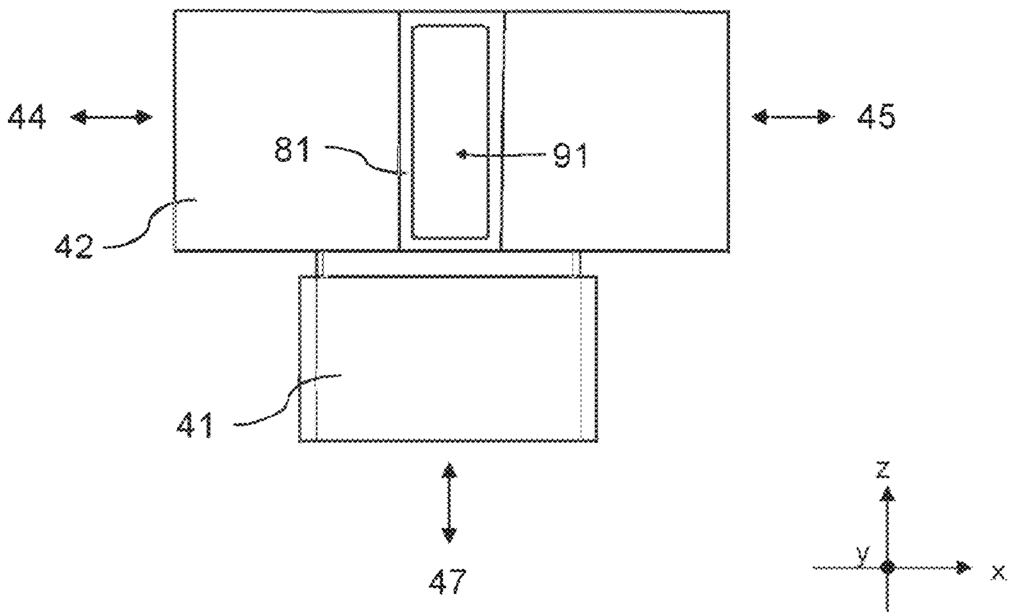
FIG. 12 shows an illustration showing a side view, in partial cross section, of the distribution module according to the invention in the embodiment illustrated by FIG. 10.

The remainder of the text presents the technical features of the invention with reference to FIGS. 4 and 5, which show the device in its basic version; and then with reference firstly to FIGS. 6 to 9 and secondly to FIGS. 10 to 12, which show the device in two particular embodiments.

Figure 1:
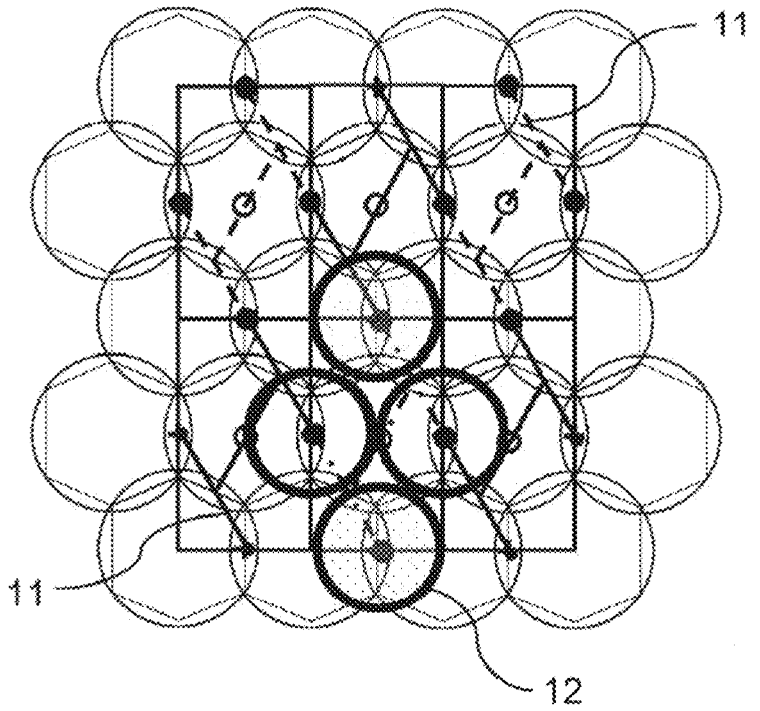
FIG. 1 shows an illustration of one example of combining four radiating sources in a diamond-shaped arrangement so as to form a beam.
Figure 2:
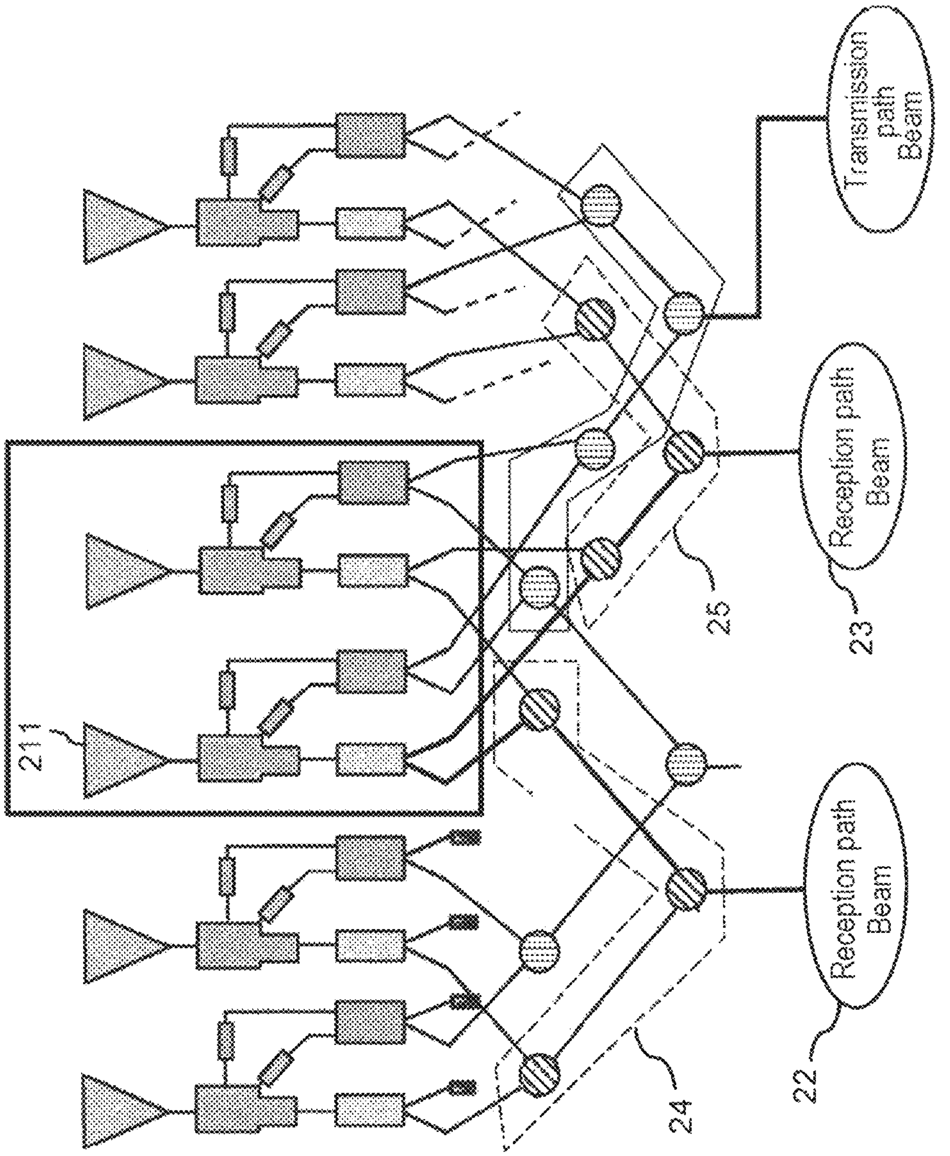
FIG. 2 shows an overview of the interconnection of the radiating elements forming the radiating source of an MFB antenna with a reflector by way of distribution module modules.
Figure 3:
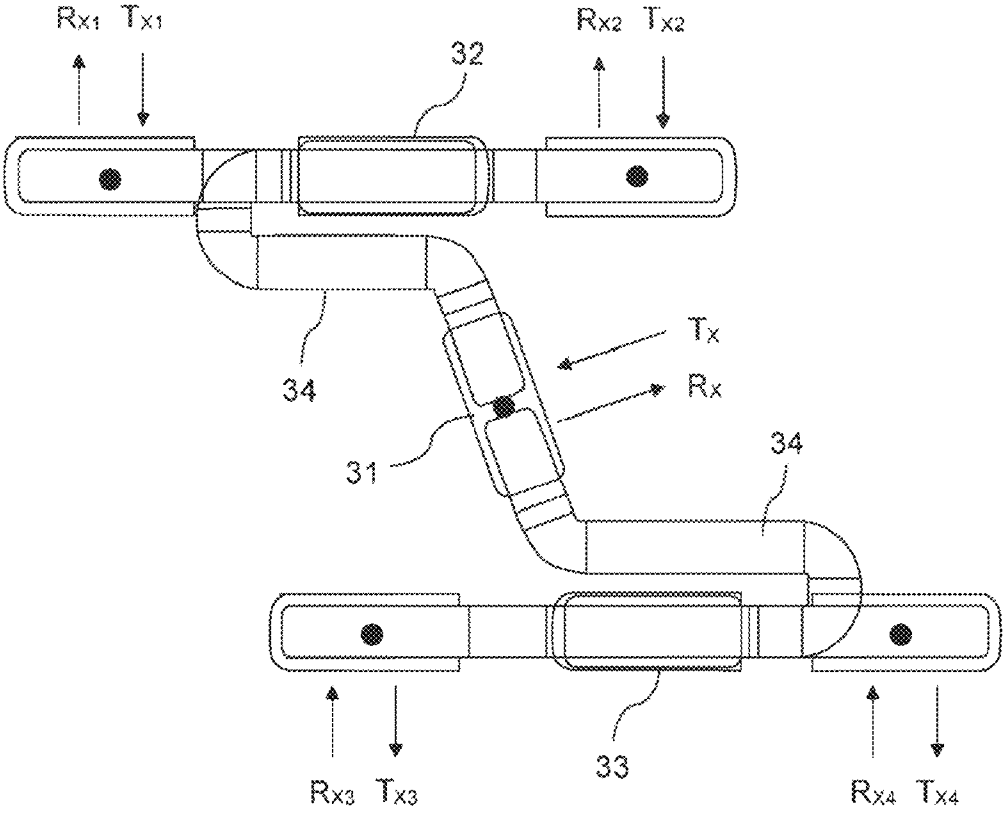
PRIOR ART FIG.3
FIG. 3 shows a schematic illustration of a distribution module according to the prior art.

FIGS. 1 to 3, already commented upon in the preamble of the description, are not the subject of specific developments. As seen in FIGS. 4 to 12, a coordinate system including an x-axis, y-axis, and z-axis is merely used for reference purposes.

As illustrated in FIGS. 4 to 7, the device according to the invention, a hybrid combiner-divider, comprises a primary waveguide 41 (FIGS. 4, 6, and 7) and two secondary waveguides 42 and 43.

The primary waveguide 41 has two ends: a first end configured so as to form an input-output port 48 (FIGS. 4 and 7), a primary input-output port, allowing the device to be connected to a signal distribution network, a beam distribution network for a multiple feed antenna such as the one described above and illustrated by FIG. 2 for example, and a second end forming an aperture 61 (FIGS. 5 and 6), located at the other end of the guide 41.

The two secondary waveguides 42 and 43 each have two opposing ends that are configured so as to form two input-output ports, the ports 44 and 45 for the waveguide 42 and the ports 46 and 47 for the waveguide 43, respectively.

Each of the guides 42 and 43 also has an aperture 62 or 63, arranged on one of its small side faces, as illustrated more specifically in the schematic view from below in FIG. 5. These apertures make it possible to put the cavity of the primary guide 41 in communication with the cavity of the secondary guide 42 or 43 under consideration.

It should be noted here that the expression "small side face" refers to the fact that the secondary guides 42 and 43 are parallelepipedal guides with a rectangular cross section and that, as such, each guide has four side faces:

- two rectangular side faces ("large faces") having a length is equal to the length of the guide and having a width is equal to the large side of the rectangle defining the cross section of the guide;
- two rectangular side faces ("small faces") having a length is equal to the length of the guide and having a width is equal to the small side of the rectangle defining the cross section of the guide.

From a structural point of view, the device according to the invention takes the form of a one-piece element having three guides that are joined to one another 41, 42 and 43.

In this structure, the two secondary guides 42 and 43 are arranged against one another and joined to one another by one of their large faces, such that the two faces in contact form a common partition 51 (FIGS. 5 and 6) separating the internal cavities of the two guides from one another.

Moreover, the two secondary guides are arranged facing one another such that the apertures 62 and 63 are situated side by side in one and the same plane, such that they form two contiguous apertures having a common edge formed by the edge of the partition 51.

According to the invention, the primary guide 41 is arranged facing the block formed by the two secondary guides 42 and 43, such that the aperture 61 formed by the open end of the primary guide 41 is positioned facing the double aperture formed by the two contiguous openings 62 and 63 of the secondary guides 42 and 43. The two cavities of the guides 42 and 43 thereby open into the cavity of the guide 41.

Figure 6:
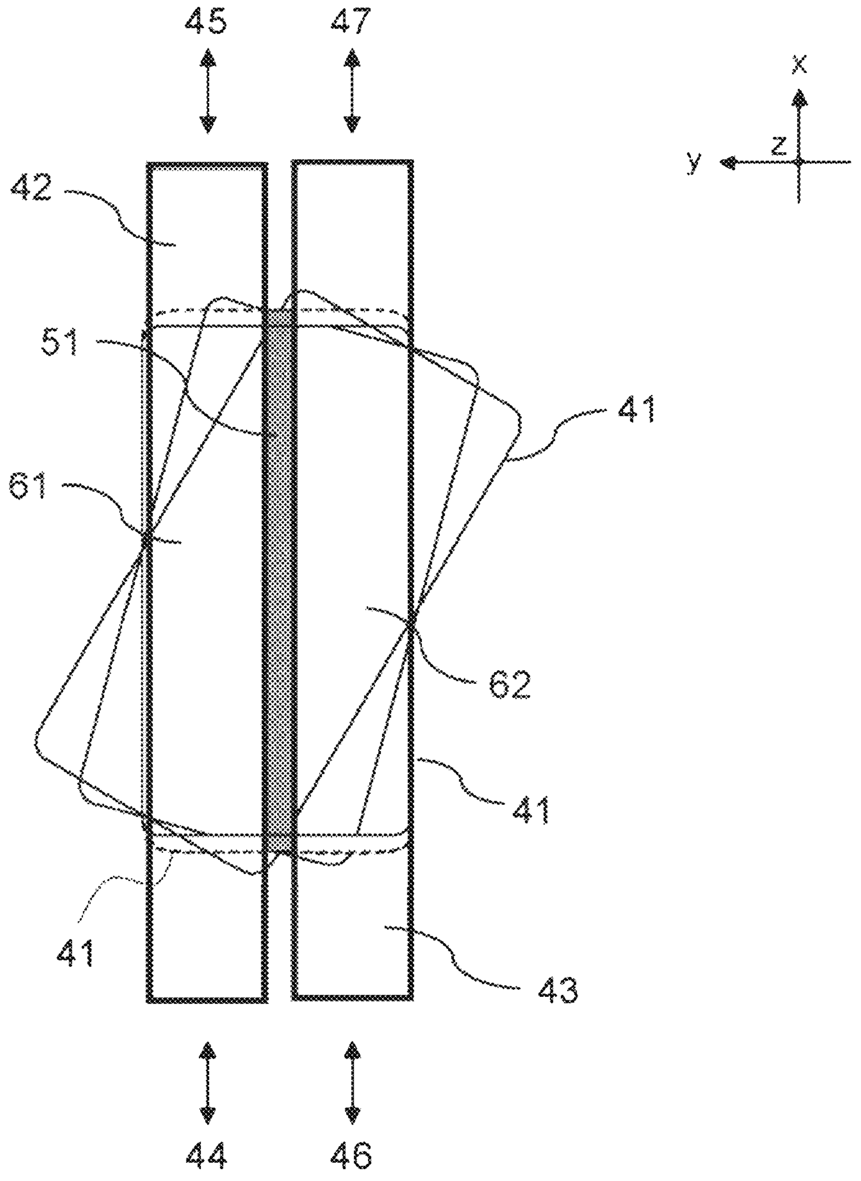
FIG. 6 shows an illustration showing a partial view from above of the distribution module according to the invention illustrated by FIG. 4.
Figure 7:
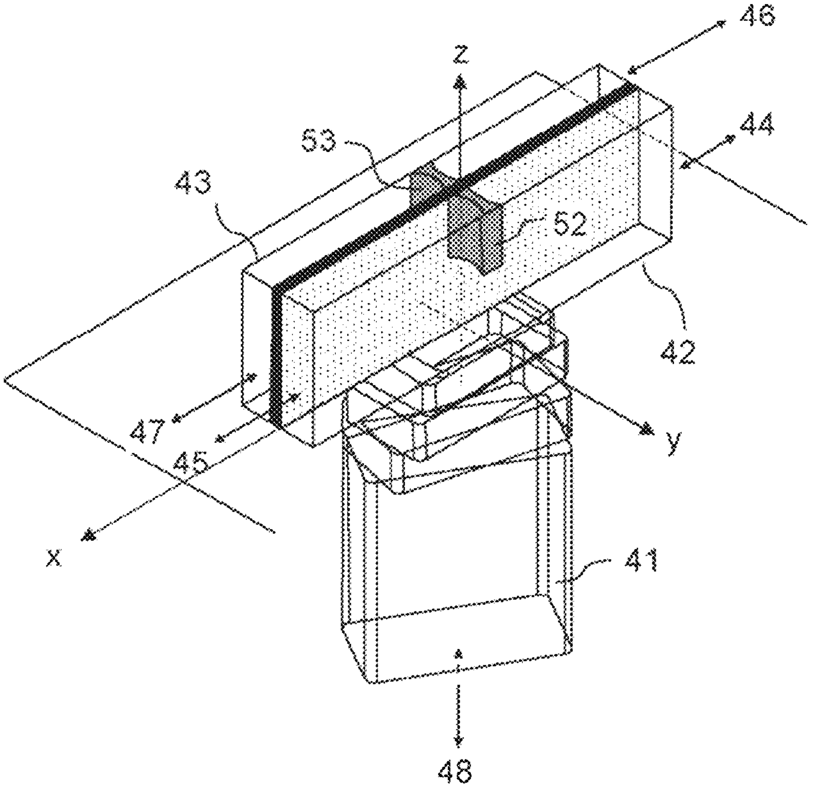
FIG. 7 shows an illustration showing an overall perspective view of the distribution module according to the invention, in a second embodiment taken as an example.

Moreover, from a structural point of view, the wall of the primary guide 41 is joined, at the apertures 62 and 63, as shown in FIGS. 5 and 6, to the two secondary guides 42 and 43. The device according to the invention thereby has a one-piece structure with a primary input-output port 48 and four secondary input-output ports 44-45 and 46-47.

From a dimensional point of view, the respective dimensions of the primary waveguide 41 and of the secondary waveguides 42 and 43, the widths and heights primarily defining the cross sections of the guides, and the dimensions of the apertures 61, 62 and 63, are defined such that the primary waveguide 41 forms an E-plane coupler with each secondary waveguide, the sum of the waves traveling through each secondary guide being equal to the wave traveling through the primary waveguide 41. The common partition 51 that separates the two apertures 61 and 62 here advantageously acts as a divider-combiner.

From a functional point of view, when integrated into a transmission chain, the device according to the invention, a reciprocal device, advantageously acts as a hybrid device that distributes, in two integrated stages, an incident wave entering via the primary port 48 onto the four secondary ports. The device thus advantageously behaves like an integrated divider (power splitter) with one input and four outputs.

Conversely, when integrated into a reception chain, the device according to the invention also advantageously acts as a hybrid device that recombines, in two integrated stages, four incident waves entering via each of the secondary input-output ports 44-45 and 46-47 into a single wave delivered by the primary input-output port 48.

FIGS. 8 and 9 illustrate a second embodiment, which is a structural variant of the basic version of the device according to the invention described above.

It is also known that, in an E-plane coupler formed by a first waveguide having one end forming an aperture opening onto the side wall of a second waveguide and forming an E-plane divider, the wave transmitted by the first waveguide to the second waveguide is divided into two waves optimally in that the impedance matching of the second waveguide is good. However, in general, a conductive element of a height is for this purpose situated inside the second guide in a central position with respect to the length of the guide, this conductive element being connected, via one of its ends, to the wall of the guide.

The embodiment in FIGS. 8 and 9 incorporates this consideration and integrates, into each of the secondary guides 42 and 43 as shown in FIG. 9, a transversely oriented conductive partition whose height is determined so as to achieve this impedance matching and thus to promote the division of the wave transmitted by the primary guide or, conversely, the phase recombination of the waves received via the secondary input-output ports.

It should be noted here that the conductive partitions 52 or 53 (FIG. 9) situated respectively in the secondary waveguides 42 and 43 have a height substantially less than the height of the guides. The conductive partitions 52 or 53 do not have a function of closing off the cross section of the guide in which each of them is situated. They may moreover be replaced with conductive elements having various shapes that project into the guide under consideration and are configured so as to ensure good impedance matching.

FIGS. 10 to 12 for their part illustrate a second embodiment of the device according to the invention, which incorporates the structural and dimensional features of the basic form illustrated by FIGS. 4 to 8.

However, in this more elaborate embodiment, the device according to the invention additionally integrates a structure for forming, at reception, "difference" paths that may be used in the context of deviation measurements.

This additional structure consists, as illustrated in particular in FIG. 10, of two complementary tertiary waveguides 81 and 82 that are rectangular and having dimensions that are matched to the frequency band of the electromagnetic waves intended to travel therethrough.

The guides 81 and 82 are situated transversely on each side of the device according to the invention at the secondary guides 42 and 43. In one preferred embodiment, these tertiary guides are situated in a central position, as illustrated by FIGS. 10 to 11.

Each guide has a first end configured so as to form an output port 83 (FIGS. 10 and 11) or 84 (FIG. 11), and a second end via which it is joined to the secondary guide with which it is associated, which forms an aperture 91 or 92.

As illustrated by the sectional side view in FIG. 12, a cross section passing through the plane of the side face of the secondary guide 42, this aperture 91 is situated facing a similar aperture formed in the large face of the corresponding secondary waveguide 42 or 43 opposite the common face forming the partition 51 (FIG. 11).

Each tertiary waveguide 81 or 82 is also dimensioned (length, cross section) so as to form, with the secondary waveguide 42 or 43 to which each tertiary waveguide 81 or 82 is attached, an H-plane coupler that makes it possible, at reception, to calculate the difference between the waves received via each of the input-output ports, 44-45 or 46-47 respectively (FIG. 11), of the secondary waveguide to which each tertiary waveguide 81 or 82 is joined.

This additional structure advantageously makes it possible, at reception, without altering the essential nature of the compactness of the device according to the invention, to form both a path, called "sum path", for which the signals transmitted to the device via the secondary input-output ports 44-47 are combined in phase, the resulting signal being delivered via the primary input-output port 48, and two paths, called "difference paths", for which the signals transmitted to the device via the secondary input-output ports 44-45, on the one hand, and 46-47, on the other hand, are combined in pairs in phase-to-phase opposition, the difference signals being respectively delivered via the input-output ports 83 and 84.

This thereby achieves a device constituting a compact structure forming a double magic tee (or hybrid tee) structure, as is known, achieves dual E-plane and H-plane coupling.

In this last embodiment, the device according to the invention may thus advantageously perform two separate functions:

- a primary function of a hybrid combiner-divider with a primary input-output port and four secondary input-output ports, the compact combiner-divider thus formed being able to be integrated into a beam distribution network for an MFB antenna;
- a secondary function for forming what are called "difference" paths that are able to be used in the context of implementing a functionality called "RF Sensing" (deviation measurement), which makes it possible, in a known manner, to measure the pointing offset of the beam under consideration with respect to the axis of the antenna along which this beam travels.

By virtue of the one-piece structure of the device according to the invention, this second functionality may be implemented without adding hardware dedicated specifically thereto.

Generally speaking, the device according to the invention may be produced using various known methods, which are not presented here, in particular using methods for producing waveguides and hybrid couplers. It may in particular be produced by molding or machining in the form of two half-shells and assembling the half-shells thus produced.

It should moreover be noted that, as illustrated by the various views presented in the appended figures, the primary waveguide may be formed by a simple straight guide or else by a "twisted" guide, without this changing the operating principle of the device, the configuration of the primary guide being essentially linked to the arrangement of the various elements forming the distribution network in which it is integrated.

The invention claimed is:

1. A reciprocal compact E/H hybrid combiner-divider for coupling or splitting electromagnetic waves, comprising at least one primary waveguide and two secondary waveguides, the at least one primary waveguide and the two secondary waveguides each having a respective parallelepipedal structure of rectangular cross section, the respective structure having a small face and a large face; wherein the at least one primary waveguide and the two secondary waveguides form a one-piece parallelepipedal structure wherein:

- the at least one primary waveguide has a first end configured so as to form an input/output port and a second end defining an aperture having a central axis;
- the two secondary waveguides each having the same configuration and substantially identical dimensions, each of the two secondary waveguides having a first end and a second end configured so as to form two input/output ports, and a respective side aperture formed on one of the small faces of each of the two secondary waveguides;
- the two secondary waveguides are arranged facing one another and facing the at least one primary waveguide so as to form a common side wall;
- the two secondary waveguides are arranged facing the at least one primary waveguide such that the respective side apertures of the two secondary waveguides are situated facing the aperture formed by the second end of the at least one primary waveguide and that the common side wall is aligned with the central axis of the aperture of the at least one primary waveguide.

2. The E/H hybrid combiner-divider as claimed in claim 1, wherein each of the two secondary waveguides comprises a respective internal conductive element situated in a cavity of the respective secondary waveguide and in electrical contact with a wall of the respective secondary waveguide, said respective internal conductive element being arranged inside the respective secondary waveguide so as to optimize the matching of the impedance of the respective secondary waveguide and the combination or the division of the waves traveling through the respective secondary waveguide.

3. The E/H hybrid combiner-divider as claimed in claim 2, wherein

- the respective internal conductive element is a pin fixed in a substantially central position on an inner face of an upper wall of the respective secondary waveguide.

4. The E/H hybrid combiner-divider as claimed in claim 2, wherein each secondary waveguide has an upper wall having an inner face, wherein the respective internal conductive element is formed by a respective wall projecting into the corresponding secondary waveguide, situated transversely in a substantially central position on an inner face of the upper wall of the respective secondary waveguide, the height of said projecting wall being substantially less than the height of the respective secondary waveguide.

5. The E/H hybrid combiner-divider as claimed in claim 1, further comprising two tertiary waveguides situated transversely with respect to each of the two secondary waveguides and joined thereto, each of the two tertiary waveguides having a respective parallelepipedal structure of rectangular cross section with a first end configured so as to form an input-output port of the respective tertiary waveguide and a second end forming an aperture of the respective tertiary waveguide situated facing the aperture formed in the side wall of each secondary waveguide opposite the common side wall, in a substantially central position, said aperture of the respective tertiary waveguide being configured so as to put each of the two secondary waveguides in communication with a corresponding tertiary waveguide of the two tertiary waveguides situated transversely with respect thereto, so as to achieve H-plane coupling, the combiner-divider thus having an E/H hybrid tee structure.

6. A beam distribution network for a multiple feed per beam (MFB) antenna, comprising a first group and a second group of the E/H hybrid combiner-dividers as claimed in claim 1, each E/H hybrid combiner-divider of the first group acting as a combiner being connected, via the input/output ports of the two secondary waveguides of the first group, to reception paths of four radiating sources and to a beam reception path via the input/output port of the at least one primary waveguide of the first group; each E/H hybrid combiner-divider of the second group acting as a combiner being connected, via the input/output ports of the two secondary waveguides of the first group, to the transmission paths of four radiating sources and to a beam transmission path via the input/output port of the at least one primary waveguide of the second group.

7. The beam distribution network for a multiple feed per beam (MFB) antenna as claimed in claim 6, wherein the E/H hybrid combiner-dividers of the first group are combiner-dividers having output ports connected to a deviation measurement device and further comprising two tertiary waveguides situated transversely with respect to each of the two secondary waveguides and joined thereto, each tertiary waveguide having a respective parallelepipedal structure of rectangular cross section with a first end configured so as to form an input-output port of the respective tertiary waveguide and a second end forming an aperture of the respective tertiary waveguide situated facing an aperture formed in a side wall of each of the two secondary waveguides opposite the common side wall, in a substantially central position, said aperture formed in the side wall of the respective secondary waveguide being configured such that the respective secondary waveguide is in communication with a corresponding tertiary waveguide situated transversely with respect thereto, so as to achieve H-plane coupling, the combiner-divider thus having an E/H hybrid tee structure.

8. An (MFB) beamforming array antenna, comprising a plurality of radiating sources combined into groups of four radiating sources and a plurality of the E/H hybrid combiner-dividers of claim 1, wherein reception paths and transmission paths of the radiating sources belonging to the same group are connected, respectively, to the two input/output ports of the two secondary waveguides of one of the plurality of the E/H hybrid combiner-dividers, which has the input/output port of the at least one primary waveguide connected to a reception path of a beam and to the input/output ports of the two secondary waveguides of another of the plurality of E/H hybrid combiner-dividers, which has the input/output port of the at least one primary waveguide connected to the transmission path of the beam.

* * * * *